(12) United States Patent
Chuang

(10) Patent No.: US 6,341,060 B1
(45) Date of Patent: Jan. 22, 2002

(54) OPTICAL DISK DRIVE ASSEMBLY HAVING A CONTROL PANEL MOUNTED MOVABLY THEREON

(75) Inventor: Kuei-Chu Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/524,529

(22) Filed: Mar. 13, 2000

(51) Int. Cl.⁷ .................................................. H05K 5/00
(52) U.S. Cl. ........................ 361/685; 361/683; 361/684; 361/724; 361/726; 361/727; 312/223.1; 312/223.3; 312/222; 439/53; 439/152; 439/928.1; 248/27.1; 248/27.3
(58) Field of Search ................................. 361/685, 683, 361/684, 686, 724, 725, 726, 727, 754, 748; 312/223.1, 223.2, 222, 265.6; 439/53, 152, 153, 157, 160, 928.1; 248/27.1, 27.3

(56) References Cited

U.S. PATENT DOCUMENTS

| | | | |
|---|---|---|---|
| 5,892,501 A | * | 4/1999 | Hiller .......................... 345/168 |
| 5,940,354 A | * | 8/1999 | Inoue ........................... 369/35 |
| 5,953,118 A | * | 9/1999 | O'Rourke et al. ........... 356/326 |
| 6,011,852 A | * | 1/2000 | Howard ........................ 381/28 |
| 6,137,677 A | * | 10/2000 | Ganthier et al. ............ 361/683 |

* cited by examiner

*Primary Examiner*—Leo P. Picard
*Assistant Examiner*—David Foster
(74) *Attorney, Agent, or Firm*—Pillsbury Winthrop LLP

(57) ABSTRACT

An optical disk drive assembly includes a hollow housing, an optical disk drive, and a control panel. The hollow housing has a bottom wall, two opposite side walls extending upwardly from two opposite sides of the bottom wall, a rear wall extending upwardly from a rear end of the bottom wall, and a front opening formed at a front end of the bottom wall and opposed to the rear wall. The optical disk drive is mounted inside the hollow housing. The optical disk drive is spaced apart from and is disposed above the bottom wall to define a clearance therebetween. The control panel is movably received in the clearance. The control panel has a front end, and a plurality of control keys disposed adjacent to the front end of the control panel and connected electrically to the optical disk drive for manipulation of the optical disk drive. The control panel is movable between a retracted position where the front end of the control panel is retracted into the hollow housing to conceal the control keys in the clearance under the optical disk drive, and an extended position where the front end of the control panel protrudes out of the front opening of the hollow housing to expose the control keys.

11 Claims, 10 Drawing Sheets

OPTICAL DISK DRIVE ASSEMBLY HAVING A CONTROL PANEL MOUNTED MOVABLY THEREON

BACKGROUND OF THE INVENTION

1. Field of the Invention

This invention relates to an optical disk drive assembly, more particularly to an optical disk drive assembly having a control panel mounted movably thereon.

2. Description of the Related Art

It is well known that notebook personal computers (PC) are equipped with optical disk drives, such as compact disk read-only-memory (CD-ROM) and digital versatile disk read-only-memory (DVD-ROM), for listening to music and watching video programs. However, the control keys for manipulation of the optical disk drives are liable to be depressed unintentionally when the optical disk drives are in use, thereby resulting in misoperation of the optical disk drives. In addition, the control keys of the optical drive disks occupy precious space on the keyboards of notebook PCs when the optical disk drives are not in use.

SUMMARY OF THE INVENTION

The object of the present invention is to provide an optical disk drive assembly in which the control keys for manipulation of an optical disk drive of the optical disk drive assembly will not be depressed unintentionally when the optical disk drive assembly is in use.

Another object of the present invention is to provide an optical disk drive assembly that will not occupy space on the keyboard of a notebook PC.

According to the present invention, the optical disk drive assembly comprises a hollow housing, an optical disk drive, and a control panel. The hollow housing has a bottom wall, two opposite side walls extending upwardly from two opposite sides of the bottom wall, a rear wall extending upwardly from a rear end of the bottom wall, and a front opening formed at a front end of the bottom wall and opposed to the rear wall. The optical disk drive is mounted inside the hollow housing. The optical disk drive is spaced apart from and is disposed above the bottom wall to define a clearance therebetween. The control panel is movably received in the clearance. The control panel has a front end, and a plurality of control keys disposed adjacent to the front end of the control panel and connected electrically to the optical disk drive for manipulation of the optical disk drive. The control panel is movable between a retracted position where the front end of the control panel is retracted into the hollow housing to conceal the control keys in the clearance under the optical disk drive, and an extended position where the front end of the control panel protrudes out of the front opening of the hollow housing to expose the control keys.

In the preferred embodiment, the optical disk drive assembly further has a spring member for biasing the control panel to move from the retracted position to the extended position, a locking mechanism for locking releaseably the control panel in the retracted position, and stop means for preventing the control panel from slipping out of the hollow housing when the control panel is moved to the extended position by the spring member.

Preferably, the side walls of the hollow housing have guide grooves formed adjacent to the bottom wall. The control panel has two guide rails that are received respectively in the guide grooves in order to guide movement of the control panel in a front-to-rear direction.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 10:
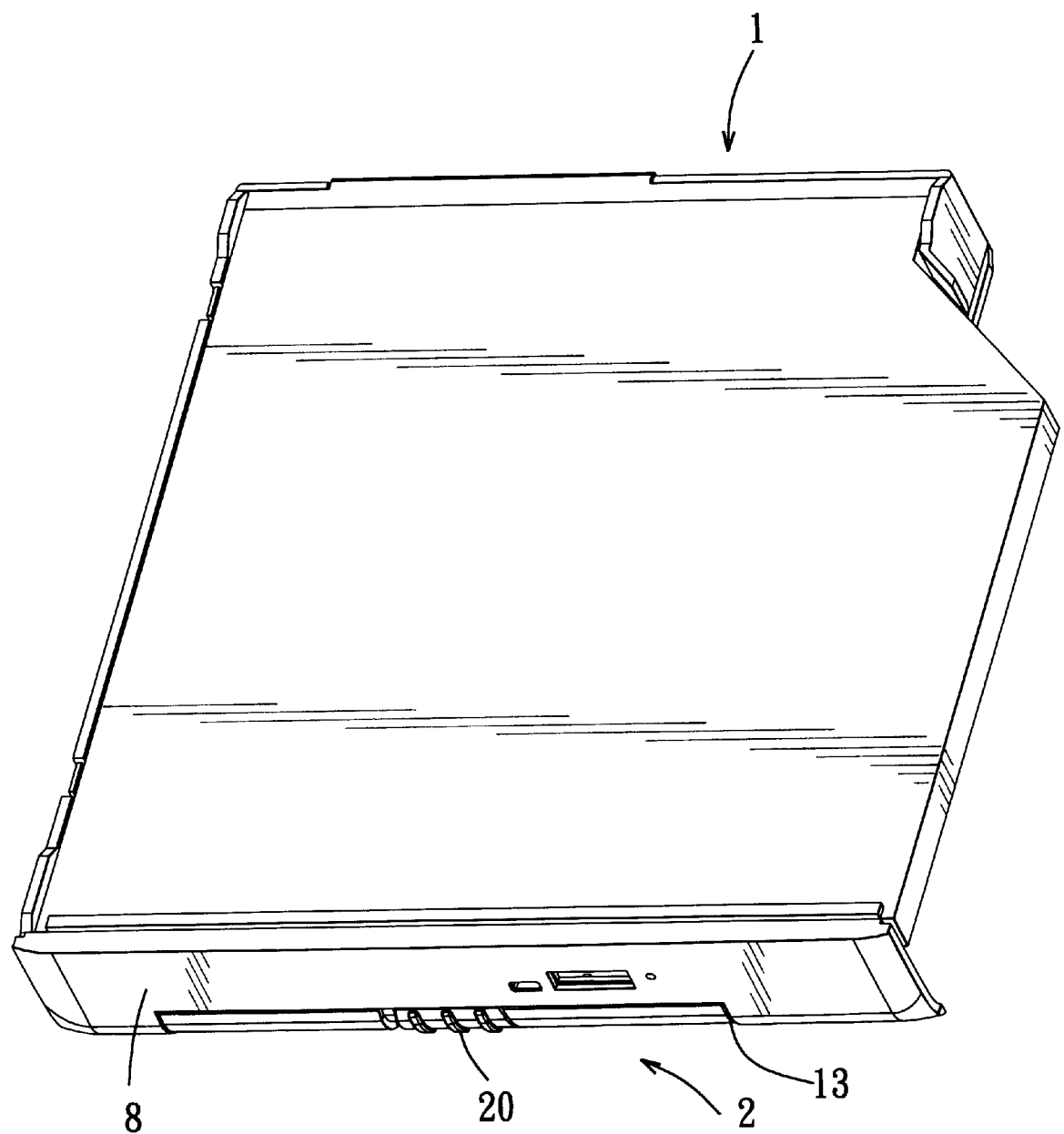
FIG. 10 is a perspective view of the preferred embodiment of the optical disk drive assembly according to the present invention.

Referring to FIG. 10, a preferred embodiment of an optical disk drive assembly according to the present invention is shown to comprise a hollow housing 1 adapted to be mounted within a notebook PC (not shown), an optical disk drive 8, such as a CD-ROM or DVD-ROM, and a control panel 2.

Figure 1:
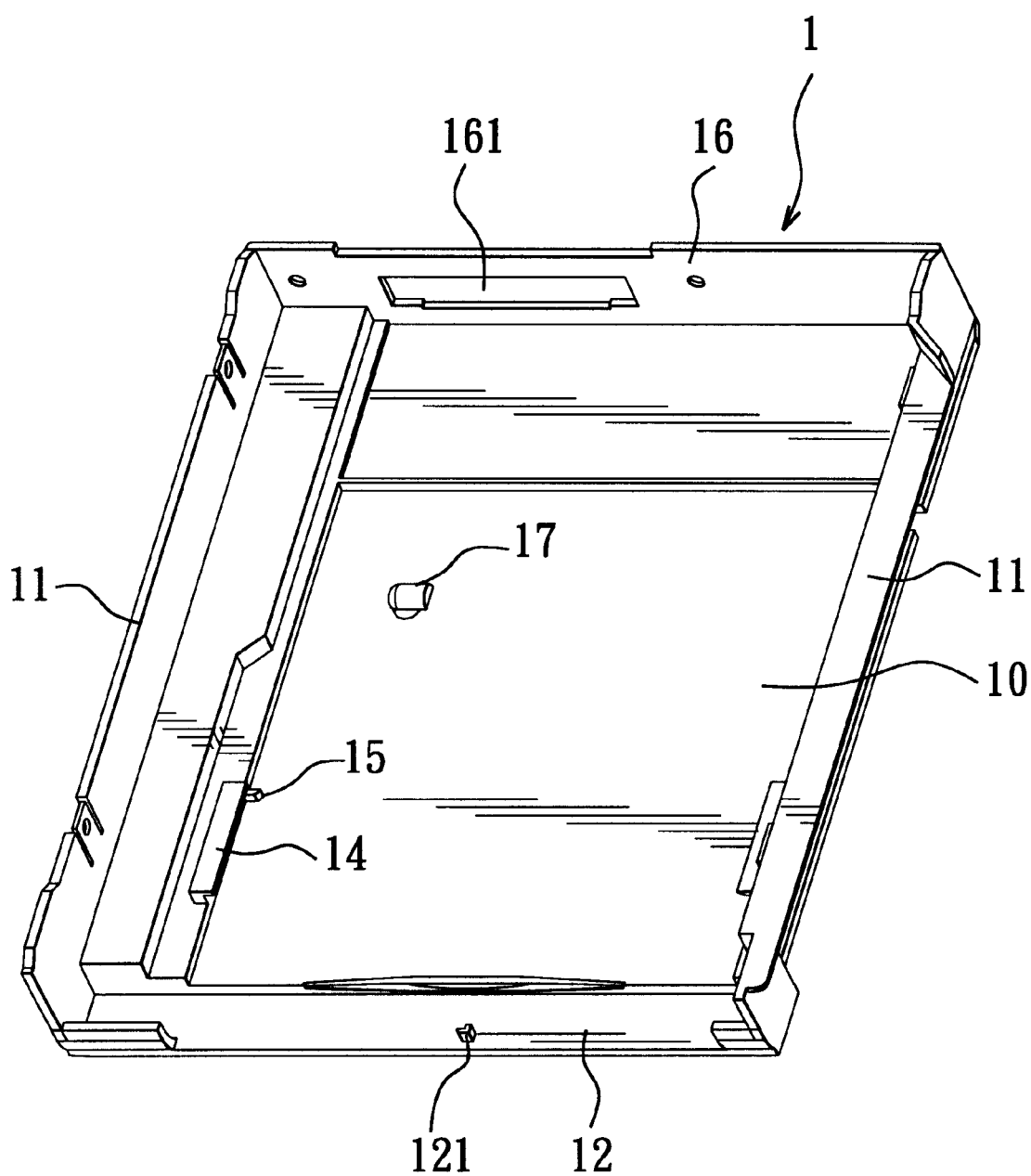
FIG. 1 is a perspective view of a preferred embodiment of a hollow housing of an optical disk drive assembly according to the present invention.

Referring to FIGS. 1 and 10, the hollow housing 1 is adapted to house the optical disk drive 8, and has a bottom wall 10, two opposite side walls 11 extending upwardly from two opposite sides of the bottom wall 10, a rear wall 16 extending upwardly from a rear end of the bottom wall 10, and a front opening 12 formed at a front end of the bottom wall 10 and opposed to the rear wall 16. The optical disk drive 8 is mounted inside the hollow housing 1. The optical disk drive 8 is spaced apart from and is disposed above the bottom wall 10 to define a clearance 13 therebetween. The control panel 2 is movably received in the clearance 13 and is connected electrically to the optical disk drive 8, which will be described in greater detail hereinbelow.

Figure 2:
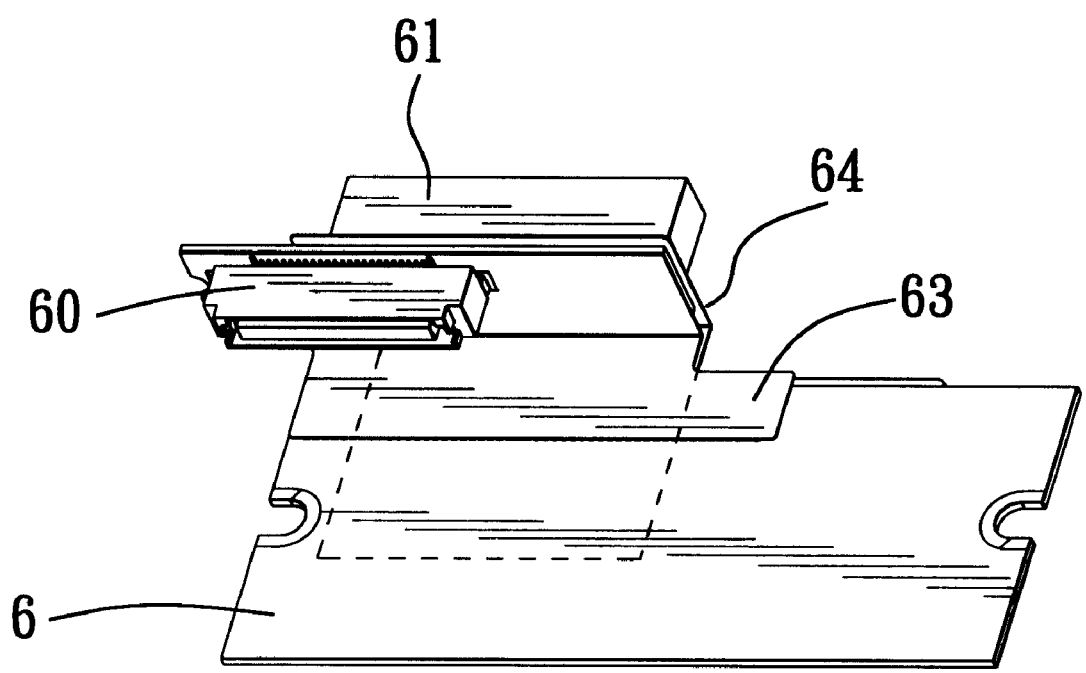
FIG. 2 is a perspective view of a circuit board adapted to be disposed in the hollow housing of the optical disk drive assembly of the preferred embodiment according to the present invention.
Figure 5:
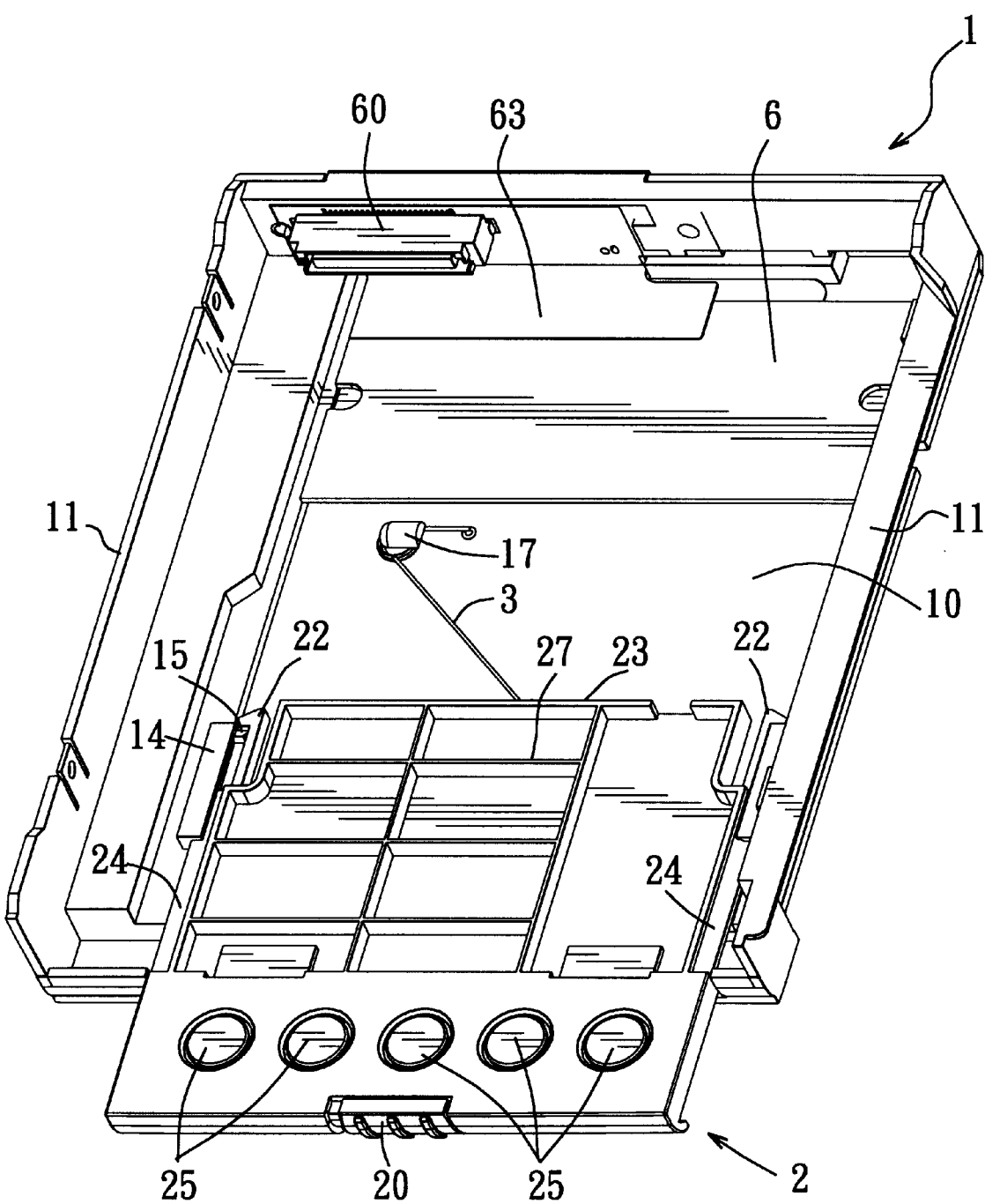
FIG. 5 is a perspective view of the hollow housing and the control panel of the optical disk drive assembly in an assembled state according to the present invention.

Referring to FIGS. 2 and 5, a circuit board 6 is disposed adjacent to the rear wall 16, and has first and second connection ports 60, 61 connected electrically thereto by a surface mount technique via first and second thin film circuit boards 63, 64, respectively. The first connection port 60 is adapted to be connected electrically to the optical disk drive 8. The second connection ports 61 extends through a mounting hole 161 in the rear wall 16 and is connected electrically to a motherboard (not shown) of the notebook PC.

Figure 3:
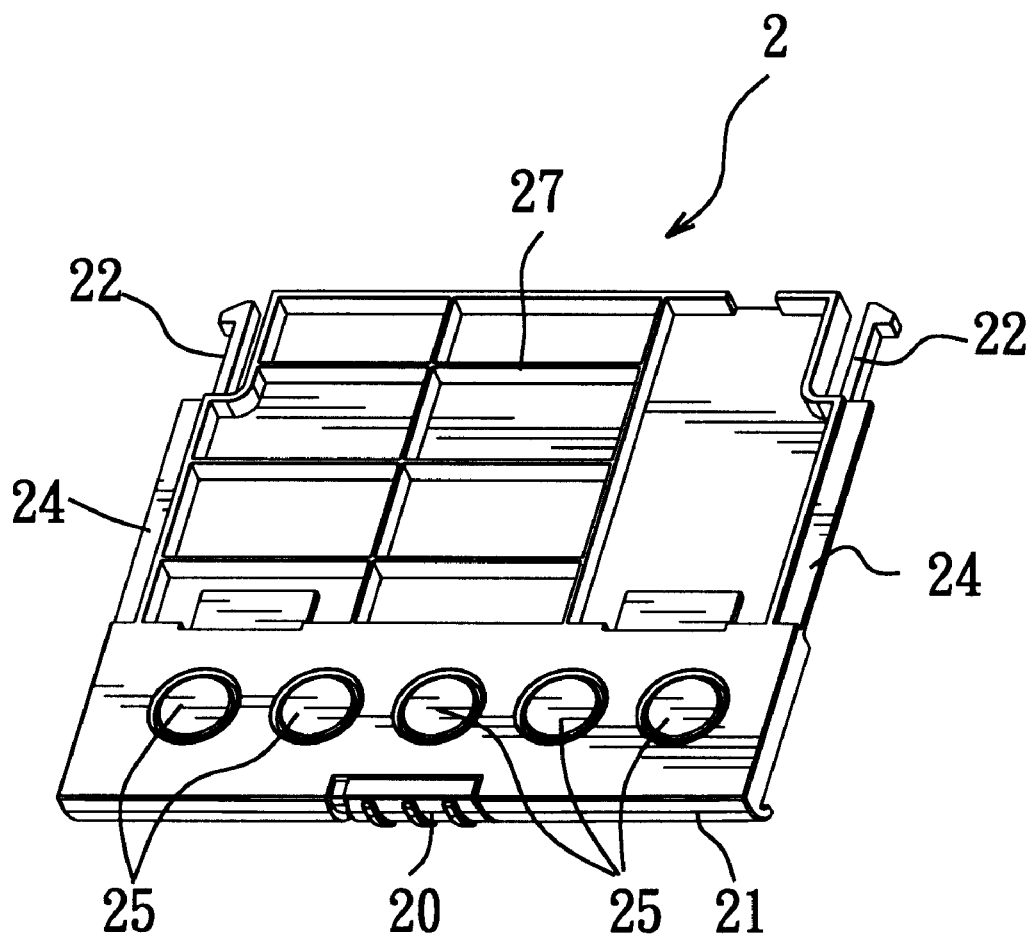
FIG. 3 is a perspective view of a control panel of the preferred embodiment of the optical disk drive assembly according to the present invention.

Referring to FIG. 3, the control panel 2 has a front end 21, and a plurality of control keys 25 disposed adjacent to the front end 21 of the control panel 2 for manipulation of the optical disk drive 8. The control keys 25 include buttons for controlling several functions of the optical disk drive 8, for example, the play, forward, review, stop, and power functions. In addition, the control panel 2 has a plurality of intersecting reinforcement ribs 27 formed on a top face thereof in order to increase the structural strength of the control panel 2. The control panel 2 is movable between a retracted position and an extended position. In the retracted position, the front end 21 of the control panel 2 is retracted into the hollow housing 1 to conceal the control keys 25 in the clearance 13 under the optical disk drive 8, as best illustrated in FIGS. 7 and 10. In the extended position, the front end 21 of the control panel 2 protrudes out of the front opening 12 of the hollow housing 1 to expose the control keys 25, as best illustrated in FIGS. 5 and 6.

Figure 6:
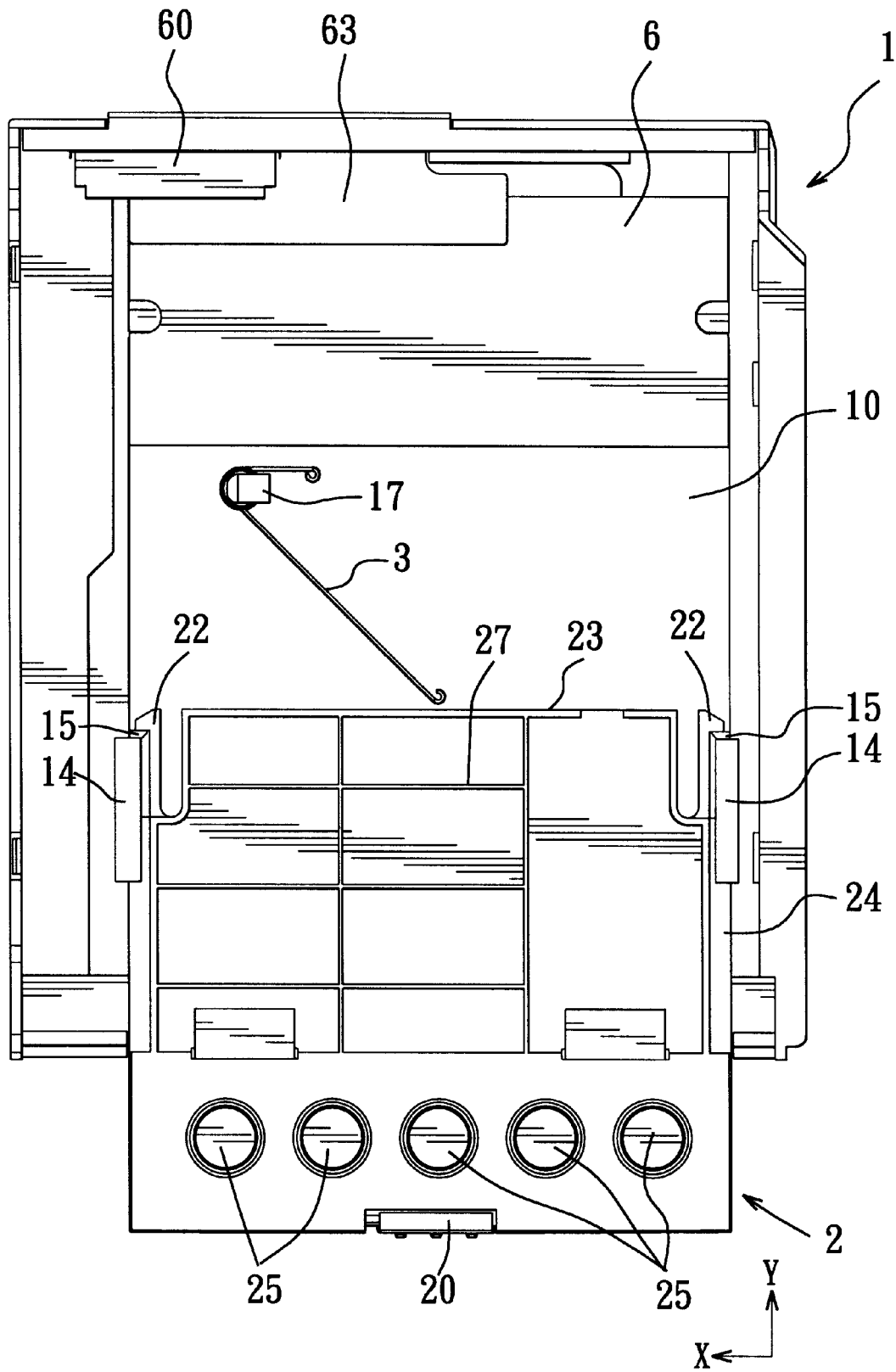
FIG. 6 is a top view of the optical disk drive assembly of FIG. 5, in which the control panel is in an extended position.
Figure 7:
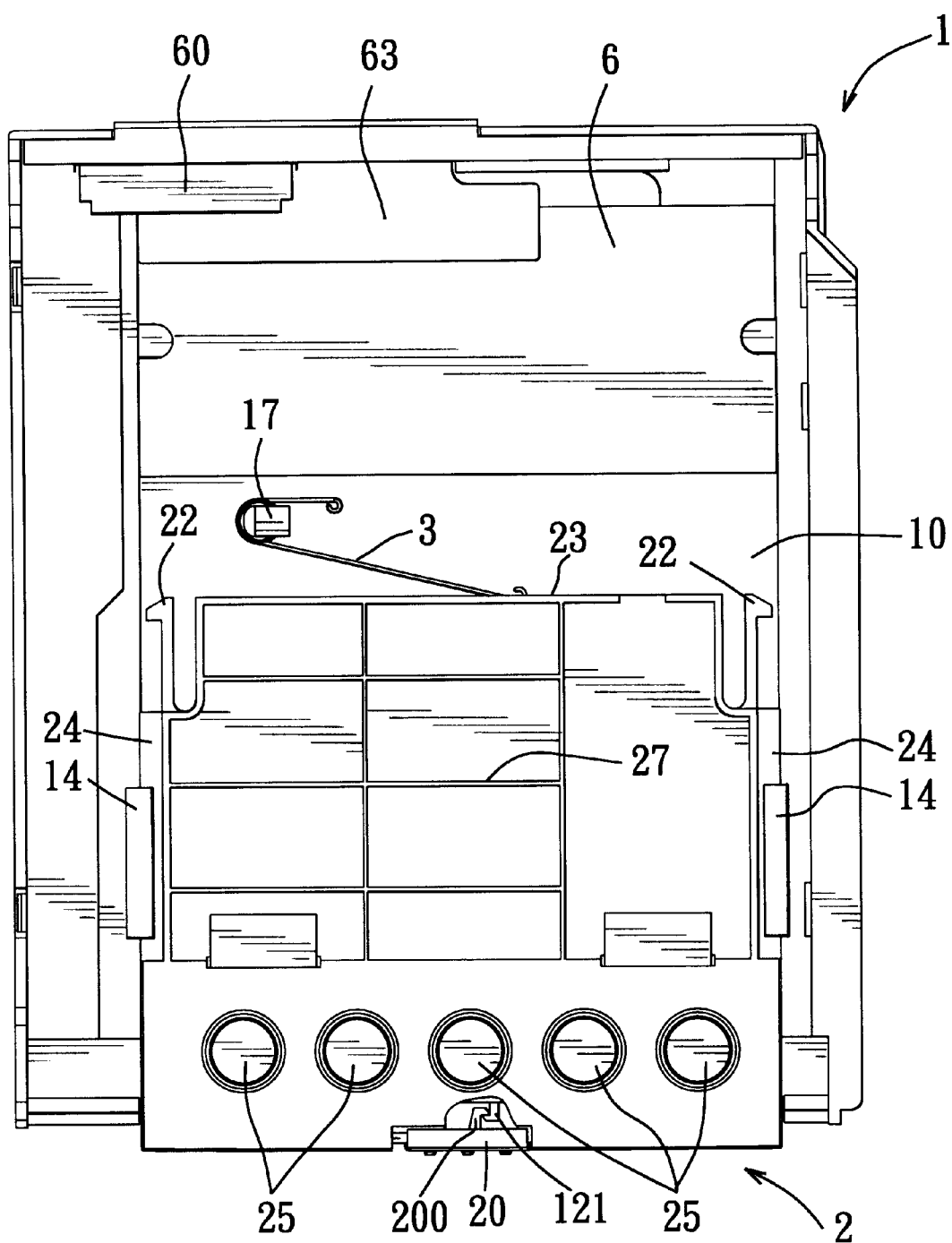
FIG. 7 is a top view of the optical disk drive assembly of FIG. 5, in which the control panel is in a retracted position.

Referring to FIGS. 5 and 6, a torsion spring member 3 is fixed to an anchor 17 on the bottom wall 10 at an intermediate portion of the spring member 3. The spring member 3 has a first end abutting against a rear end 23 of the control panel 2 and a second end fixed on the bottom wall 10 of the hollow housing 1, as best illustrated in FIG. 7, in order to bias the control panel 2 to move from the retracted position to the extended position. Stop means is provided for preventing the control panel 2 from slipping out of the hollow housing 1 when the control panel 2 is moved to the extended position by the spring member 3. The stop means includes two retaining hooks 22 formed on the opposite sides of the control panel 2 adjacent to the rear end 23 of the control panel 2, and two projections 15 that are formed respectively on inside faces of the side walls 15 and that engage respectively the retaining hooks 22 to limit forward movement of the control panel 2 after the control panel 2 moves to the extended position. In addition, the side walls 11 of the hollow housing 1 have guide grooves 14 formed adjacent to the bottom wall 10. The control panel 2 has two guide rails 24 that are received respectively in the guide grooves 14 in order to guide movement of the control panel 2 in a front-to-rear direction.

Figure 4:
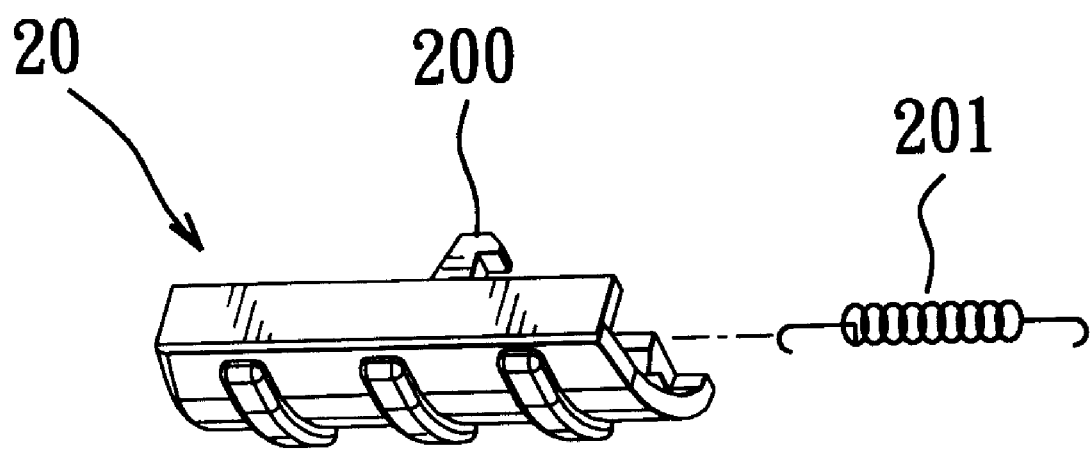
FIG. 4 is an exploded perspective view of a locking mechanism of the preferred embodiment of the optical disk drive assembly according to the present invention.

The optical disk drive assembly further has a locking mechanism for locking releaseably the control panel 2 in the retracted position. The locking mechanism includes a retainer 20 with a first hook member 200 mounted movably on the front end 21 of the control panel 2, as shown in FIG. 4, and a second hook member 121 formed on the front end of the bottom wall 10 of the hollow housing 1, as shown in FIG. 1. The first hook member 200 is slidable relative to the control panel 2 in a direction transverse to the front-to-rear direction between a locked position and an unlocked position. The second hook member 121 engages the first hook member 200 when the first hook member 200 moves to the locked position while the control panel 2 moves to the retracted position, as best illustrated in FIG. 7. As such, the retainer 20 can be moved in a direction as shown by the arrow "X" in FIG. 6 to disengage the first hook member 200 from the second hook member 121 in order to permit forward movement of the control panel 2 from the retracted position to the extended position due to the spring action of the spring member 3. The forward movement of the control panel 2 results in exposure of the control keys 25 from the hollow housing 1. Moreover, the locking mechanism has a return spring 201 that interconnects the first hook member 200 and the control panel 2 in order to urge the first hook member 200 to move toward the locked position. When the control panel 2 is moved in a direction as shown by the arrow "Y" in FIG. 6 from the extended position to the retracted position, an inclined end face of the first hook member 200 slides over an inclined end face of the second hook member 121. The first hook member 200 is moved in the direction as shown by the arrow "X" and is then moved to the locked position wherein the first and second hook members 200, 121 are locked together by the spring action of the return spring 201. In this state, the control keys 25 on the control panel 2 can be concealed within the hollow housing 1 to avoid unintentional depressing of the control keys 25 when the optical disk drive 8 is actuated. Besides, the control keys 25 for manipulation of the optical disk drive 8 can be eliminated to save space on the keyboard of the notebook PC. The objects of the present invention are thus met.

Figure 8:
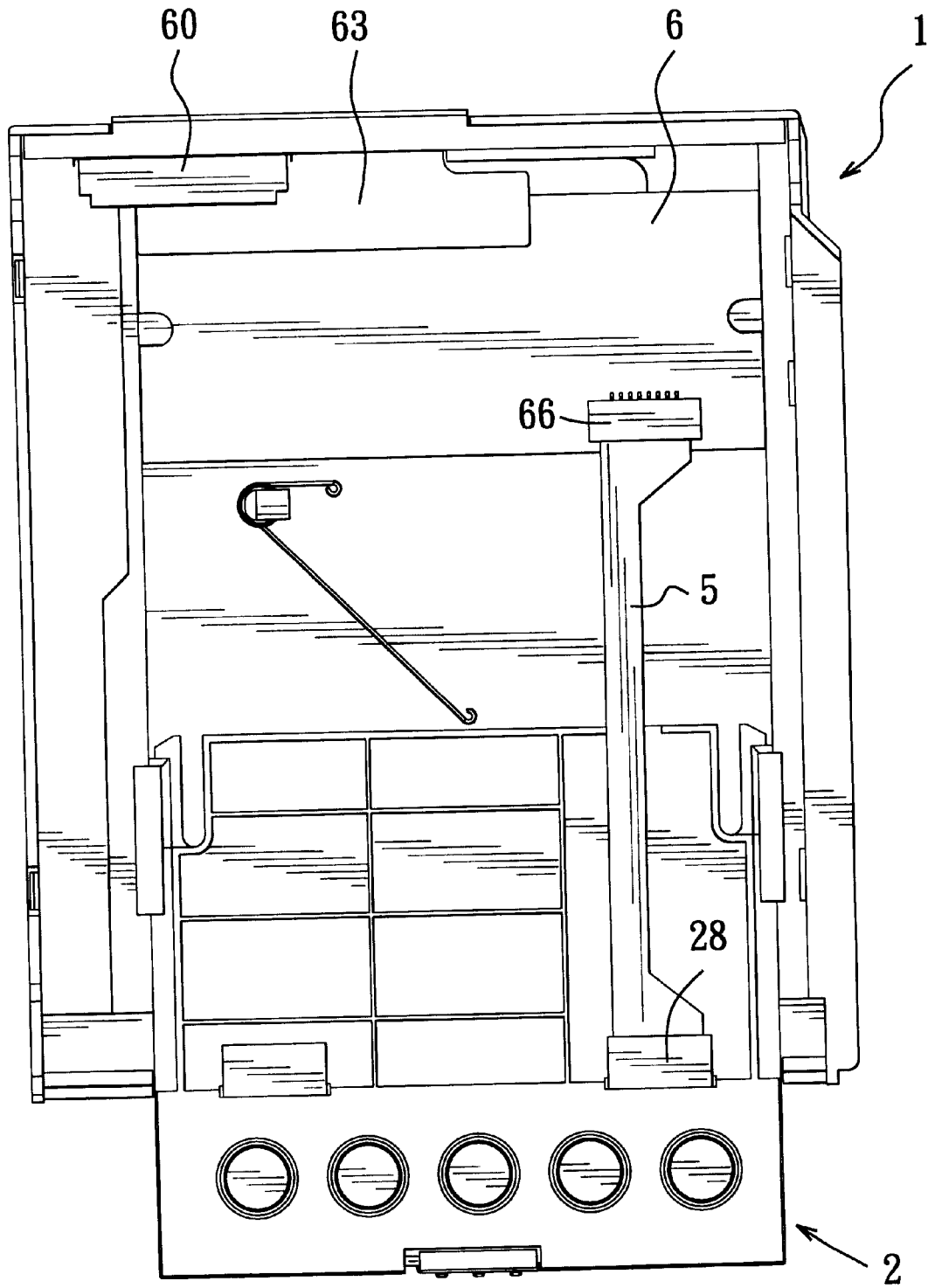
FIG. 8 is a top view of the optical disk drive assembly of FIG. 5, in which the circuit board is connected electrically to the control panel by a flexible printed circuit.
Figure 9:
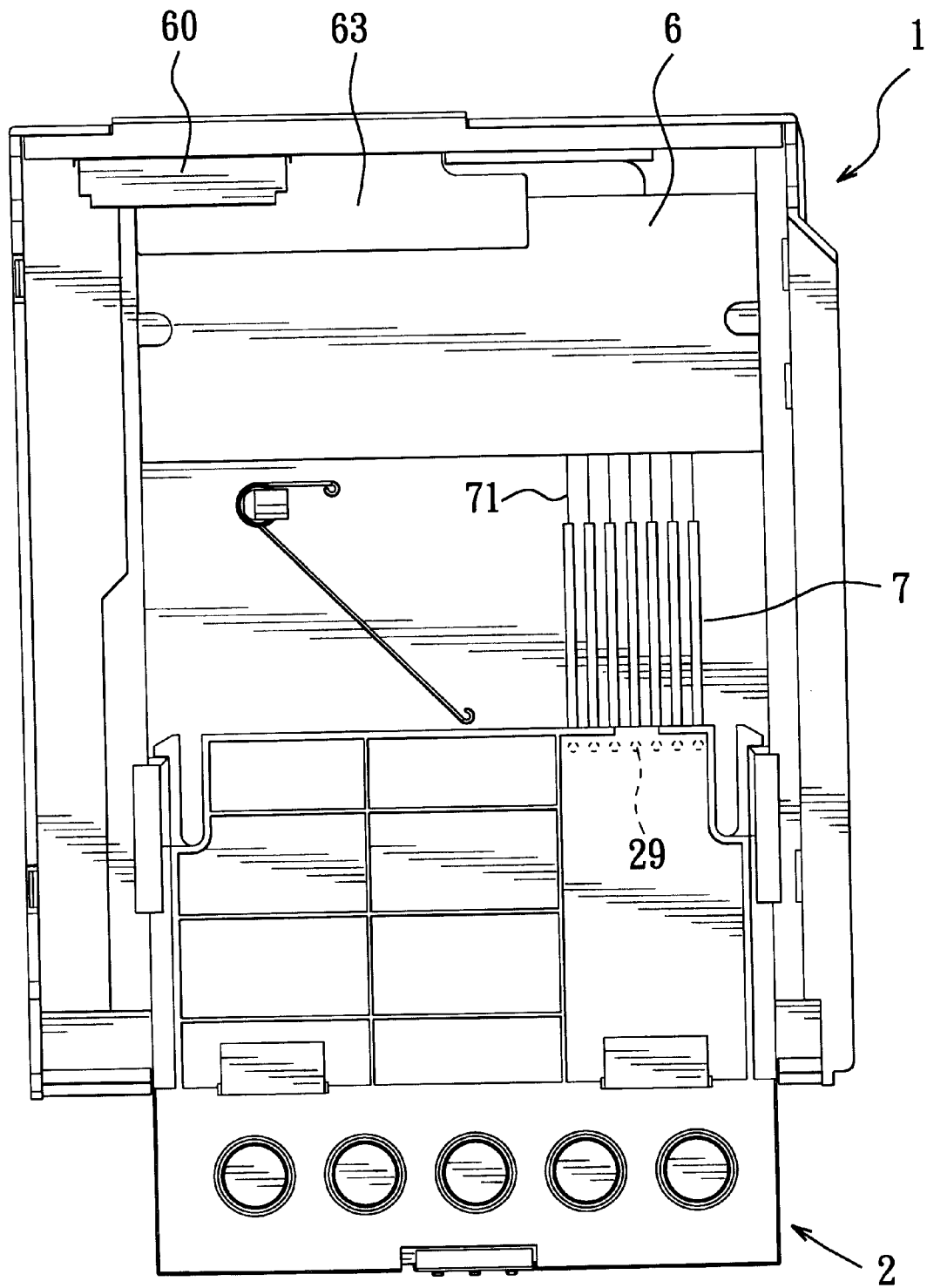
FIG. 9 is a top view of the optical disk drive assembly of FIG. 5, in which the circuit board is connected electrically to the control panel by conductive wires on the circuit board and metal contacts on the control panel.

To transmit the control signals from the control keys 25 to the optical disk drive 8, the control keys 25 are connected electrically to the circuit board 6 by virtue of two conventional ways. First, with reference to FIG. 8, the circuit board 6 has a first connector 66 mounted thereon. The control panel 2 has a second connector 28 that is connected to the first connector 66 via a flexible printed circuit 5 and that is connected to the control keys 25. As such, the control keys 25 can connect electrically to the optical disk drive 8 via the circuit board 6. Second, with reference to FIG. 9, the circuit board 6 has seven conductive wires 71 extending therefrom in the front-to-rear direction and connected electrically thereto. Seven metal traces 7 are disposed on a top face of the bottom wall 10 and extend from distal ends of the conductive wires 71 toward the front opening 12. The control panel 2 has seven metal contacts 79, each of which contacts electrically and slidably a corresponding one of the metal traces 7. Five metal contacts 79 are connected electrically and respectively to the control keys 25. As such, the control keys 25 can connect electrically to the optical disk drive 8 via the circuit board 6.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:
1. An optical disk drive assembly, comprising:
   a hollow housing having a bottom wall, two opposite side walls extending upwardly from two opposite sides of said bottom wall, a rear wall extending upwardly from a rear end of said bottom wall, and a front opening formed at a front end of said bottom wall and opposed to said rear wall;
   an optical disk drive mounted inside said hollow housing, said optical disk drive being spaced apart from and being disposed above said bottom wall to define a clearance therebetween; and
   a control panel movably received in said clearance, said control panel having a front end, and a plurality of control keys disposed adjacent to said front end of said control panel, and connected electrically to said optical disk drive for manipulation of said optical disk drive, said control panel being movable between a retracted position where said front end of said control panel is retracted into said hollow housing to conceal said control keys in said clearance under said optical disk drive, and an extended position where said front end of said control panel protrudes out of said front opening of said hollow housing to expose said control keys.

2. The optical disk drive assembly as claimed in claim 1, further comprising a spring member for biasing said control panel to move from said retracted position to said extended position, and a locking mechanism for locking releaseably said control panel in said retracted position.

3. The optical disk drive assembly as claimed in claim 2, further comprising stop means for preventing said control panel from slipping out of said hollow housing when said control panel is moved to said extended position by said spring member.

4. The optical disk drive assembly as claimed in claim 3, wherein said side walls of said hollow housing have guide grooves formed adjacent to said bottom wall, said control panel having two guide rails that are received respectively in said guide grooves in order to guide movement of said control panel in a front-to-rear direction.

5. The optical disk drive assembly as claimed in claim 4, wherein said locking mechanism includes a first hook member mounted movably on said front end of said control panel and slidable relative to said control panel in a direction transverse to said front-to-rear direction between a locked position and an unlocked position, and a second hook member formed on said front end of said bottom wall of said hollow housing, said second hook member engaging said first hook member when said first hook member moves to said locked position while said control panel moves to said retracted position.

6. The optical disk drive assembly as claimed in claim 5, wherein said locking mechanism further has a return spring that interconnects said first hook member and said control panel in order to urge said first hook member to move toward said locked position.

7. The optical disk drive assembly as claimed in claim 3, wherein said control panel has a rear end that is opposed to said front end thereof, and two opposite sides that interconnect said front and rear ends thereof, said stop means including two retaining hooks formed on said opposite sides of said control panel adjacent to said rear end of said control panel, and two projections that are formed respectively on inside faces of said side walls and that engage respectively said retaining hooks to limit forward movement of said control panel after said control panel moves to said extended position.

8. The optical disk drive assembly as claimed in claim 4, wherein said hollow housing further has a circuit board that is disposed adjacent to said rear wall thereof and that is connected electrically to said optical disk drive, said circuit board having a first electrical input/output portion formed thereon, said control panel having a second electrical input/output portion that is connected electrically to said control keys, said first and second electrical input/output portions being connected electrically to one another in order to interconnect electrically said control panel and said optical disk drive.

9. The optical disk drive assembly as claimed in claim 8, wherein said first electrical input/output portion includes a first connector mounted on said circuit board, said second electrical input/output portion including a second connector mounted on said control panel and connected electrically to said control keys, said first and second connectors having a flexible printed circuit connected therebetween.

10. The optical disk drive assembly as claimed in claim 8, wherein said first electrical input/output portion includes a plurality of conductive wires extending in said front-to-rear direction from and connected electrically to said circuit board, said conductive wires having metal traces extending from distal ends thereof toward said front opening, said second electrical input/output portion including a plurality of metal contacts formed on said control panel and connected electrically to said control keys, each of said metal contacts contacting electrically and slidably to a corresponding one of said metal traces.

11. The optical disk drive assembly as claimed in claim 1, wherein said control panel has a top face, and a plurality of intersecting reinforcement ribs formed on said top face thereof.

* * * * *